United States Patent
Sapozhnikov et al.

(10) Patent No.: US 9,552,834 B1
(45) Date of Patent: Jan. 24, 2017

(54) STABILIZATION OF ONE OR MORE UPPER SENSORS IN MULTI-SENSOR READERS

(71) Applicant: Seagate Technology LLC, Cupertino, CA (US)

(72) Inventors: Victor Boris Sapozhnikov, Minnetonka, MN (US); Steven P. Bozeman, Savage, MN (US); Mohammed Shariat Ullah Patwari, Eden Prairie, MN (US); LiWen Tan, Eden Prairie, MN (US); Jae Young Yi, Prior Lake, MN (US); Eric W. Singleton, Maple Plain, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/867,836

(22) Filed: Sep. 28, 2015

(51) Int. Cl.
G11B 5/39 (2006.01)

(52) U.S. Cl.
CPC .......... G11B 5/3951 (2013.01); G11B 5/3912 (2013.01)

(58) Field of Classification Search
None
See application file for complete search history.

(56) References Cited

U.S. PATENT DOCUMENTS

| | | | |
|---|---|---|---|
| 7,719,802 B2 | 5/2010 | Kautzky et al. | |
| 8,238,063 B2* | 8/2012 | Qiu | B82Y 10/00 360/324.11 |
| 8,582,249 B2 | 11/2013 | Sapozhnikov et al. | |
| 8,638,530 B1* | 1/2014 | Hsu | G11B 5/3912 360/319 |
| 8,737,023 B2 | 5/2014 | Sapozhnikov et al. | |
| 8,822,046 B2* | 9/2014 | Singleton | G01R 33/093 360/324.11 |
| 8,824,106 B1 | 9/2014 | Garfunkel et al. | |
| 8,891,207 B1* | 11/2014 | Li | G11B 5/115 360/121 |
| 9,042,058 B1* | 5/2015 | Li | G11B 5/3912 360/316 |
| 9,042,059 B1 | 5/2015 | Katine et al. | |
| 9,087,527 B1* | 7/2015 | Li | G11B 5/02 |
| 9,099,115 B2* | 8/2015 | Braganca | G11B 5/3143 |
| 9,099,125 B1* | 8/2015 | Hattori | G11B 5/3912 |
| 9,165,570 B2* | 10/2015 | Lu | G01R 33/093 |
| 9,318,133 B2* | 4/2016 | Freitag | G11B 5/3909 |
| 2010/0232072 A1* | 9/2010 | Dimitrov | B82Y 25/00 360/319 |
| 2011/0007427 A1* | 1/2011 | Qiu | B82Y 10/00 360/319 |

(Continued)

*Primary Examiner* — Will J Klimowicz
(74) *Attorney, Agent, or Firm* — Westman, Champlin & Koehler, P.A.

(57) ABSTRACT

A multi-sensor reader that includes a first sensor that has a first sensor stack, which includes a sensing layer that has a magnetization that changes according to an external magnetic field. The first sensor also includes a first seed element below the first sensor stack. The multi-sensor reader also includes a second sensor stacked over the first sensor. The second sensor includes a second sensor stack, which includes a sensing layer that has a magnetization that changes according to the external magnetic field. The second sensor also includes a second seed element below the second sensor stack. The second seed element is structurally different from the first seed element and includes a stabilization feature.

19 Claims, 9 Drawing Sheets

(56) References Cited

U.S. PATENT DOCUMENTS

| | | | | |
|---|---|---|---|---|
| 2012/0276415 A1* | 11/2012 | Sapozhnikov | ....... | G01R 33/093 428/831 |
| 2013/0293225 A1* | 11/2013 | Singleton | ............... | B82Y 25/00 324/252 |
| 2014/0268417 A1* | 9/2014 | Singleton | ................ | G11B 5/115 360/123.12 |
| 2014/0356648 A1* | 12/2014 | Singleton | ............ | G01R 33/093 428/811.1 |
| 2015/0062735 A1* | 3/2015 | Sapozhnikov | .......... | G11B 5/115 360/46 |
| 2015/0062755 A1* | 3/2015 | Sapozhnikov | ....... | G11B 5/3951 360/235.4 |
| 2015/0131179 A1* | 5/2015 | Braganca | ................. | G11B 5/84 360/75 |
| 2015/0140685 A1* | 5/2015 | Watanabe | ............. | H01L 21/312 438/3 |
| 2015/0243307 A1* | 8/2015 | Lu | ........................ | G11B 5/3912 360/319 |

\* cited by examiner

STABILIZATION OF ONE OR MORE UPPER SENSORS IN MULTI-SENSOR READERS

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities.

SUMMARY

The present disclosure relates to a multi-sensor reader that addresses challenges posed by greater data density requirements and faster data transfer speeds. The multi-sensor reader also addresses magnetic instability-related challenges by including at least one stabilization feature in an upper sensor of the multi-sensor reader. The multi-sensor reader includes a first sensor that has a first sensor stack, which includes a sensing layer that has a magnetization that changes according to an external magnetic field. The first sensor also includes a first seed element below the first sensor stack. The multi-sensor reader also includes a second sensor stacked over the first sensor. The second sensor includes a second sensor stack, which includes a sensing layer that has a magnetization that changes according to the external magnetic field. The second sensor also includes a second seed element below the second sensor stack. The second seed element is structurally different from the first seed element and includes a stabilization feature.

Other features and benefits that characterize embodiments of the disclosure will be apparent upon reading the following detailed description and review of the associated drawings.

DETAILED DESCRIPTION OF ILLUSTRATIVE EMBODIMENTS

Magnetic reproducing device embodiments described below relate to multi-sensor readers that include at least one feature that helps prevent unwanted magnetic instability in at least one upper sensor (i.e., a sensor formed over a bottom sensor) of the multi-sensor reader. However, prior to providing additional details regarding the different embodiments, a description of an illustrative operating environment is provided below.

Figure 1:
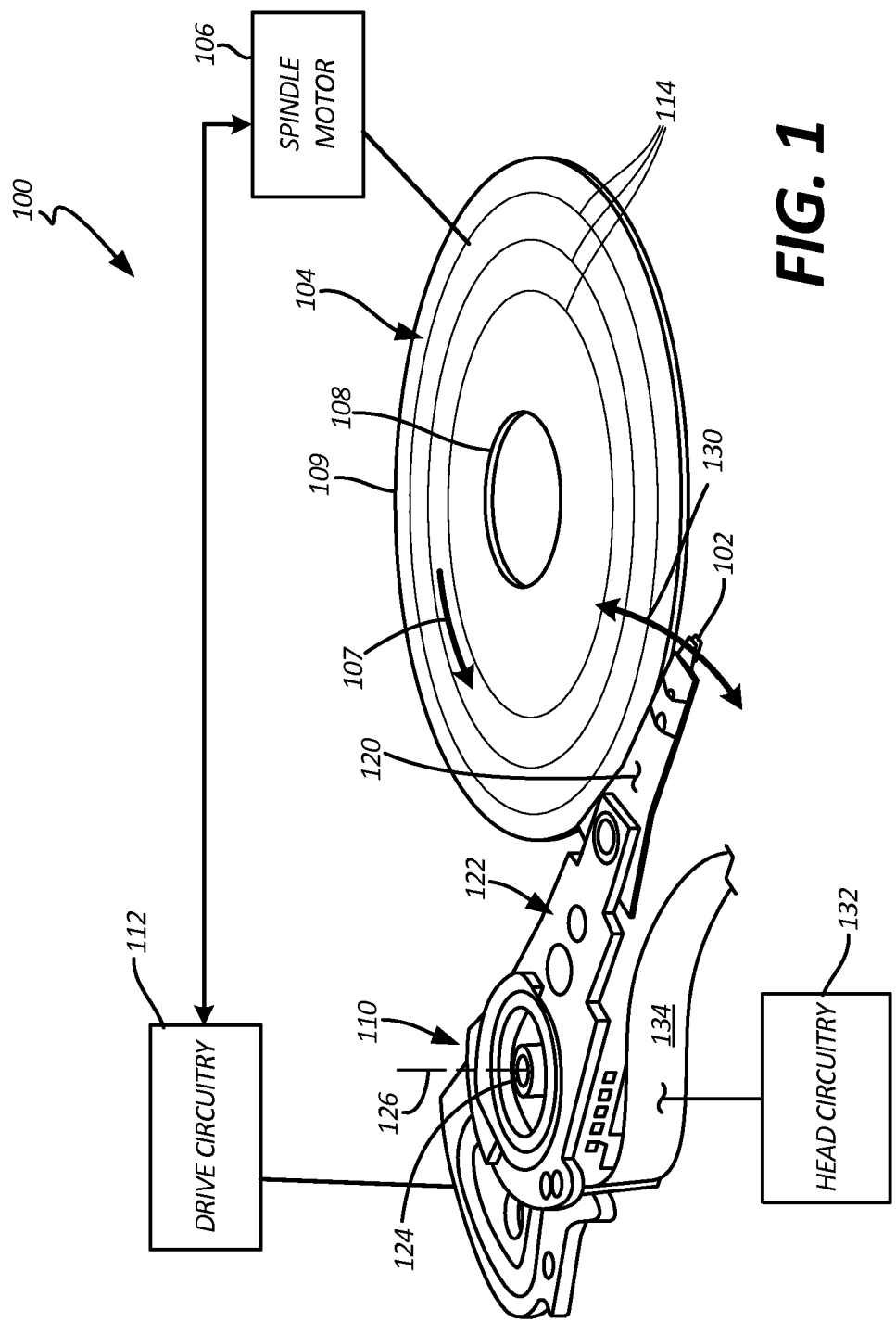
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
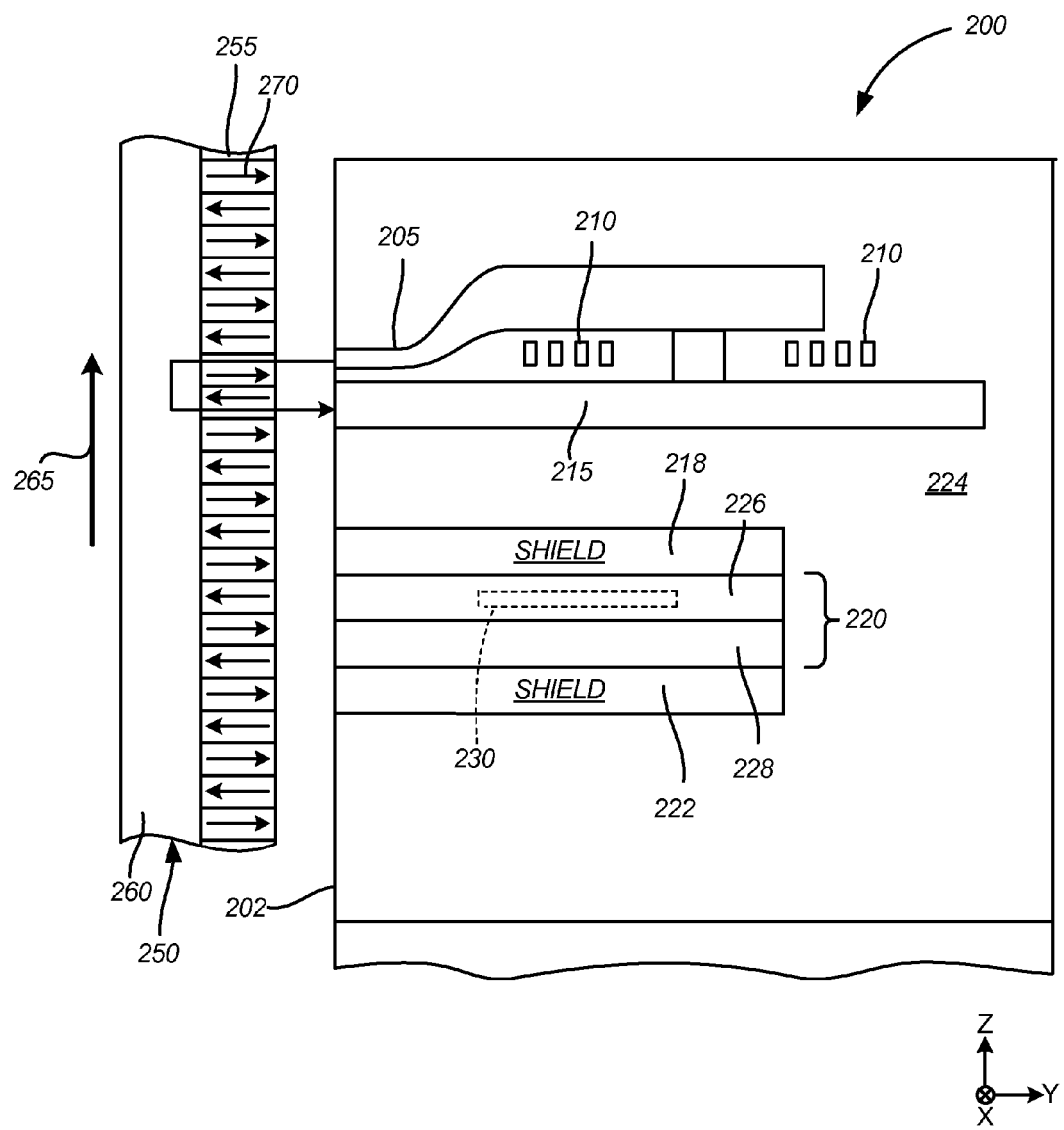
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1.

Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Figure 3A:
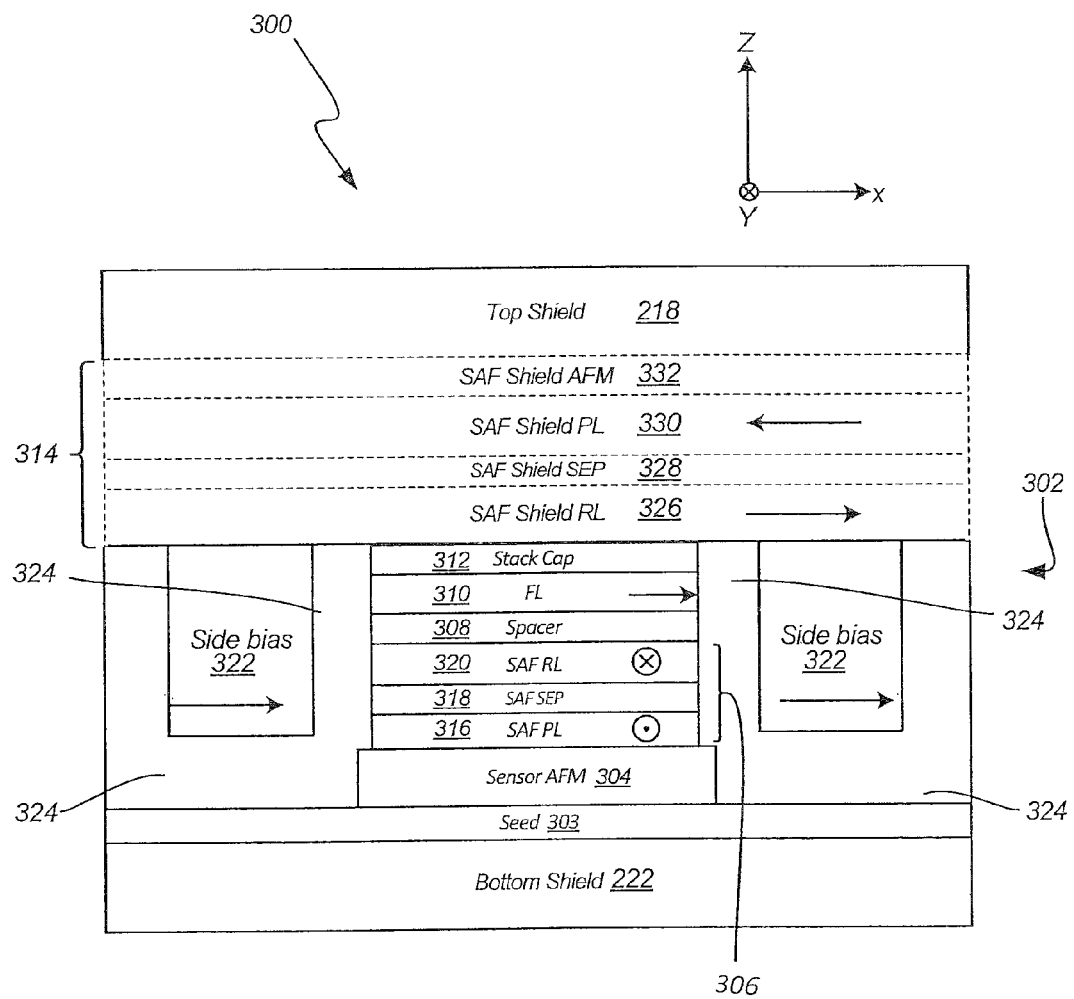
FIG. 3A is a bearing surface view of a magnetic reproducing device having a single read sensor.
Figure 3B:
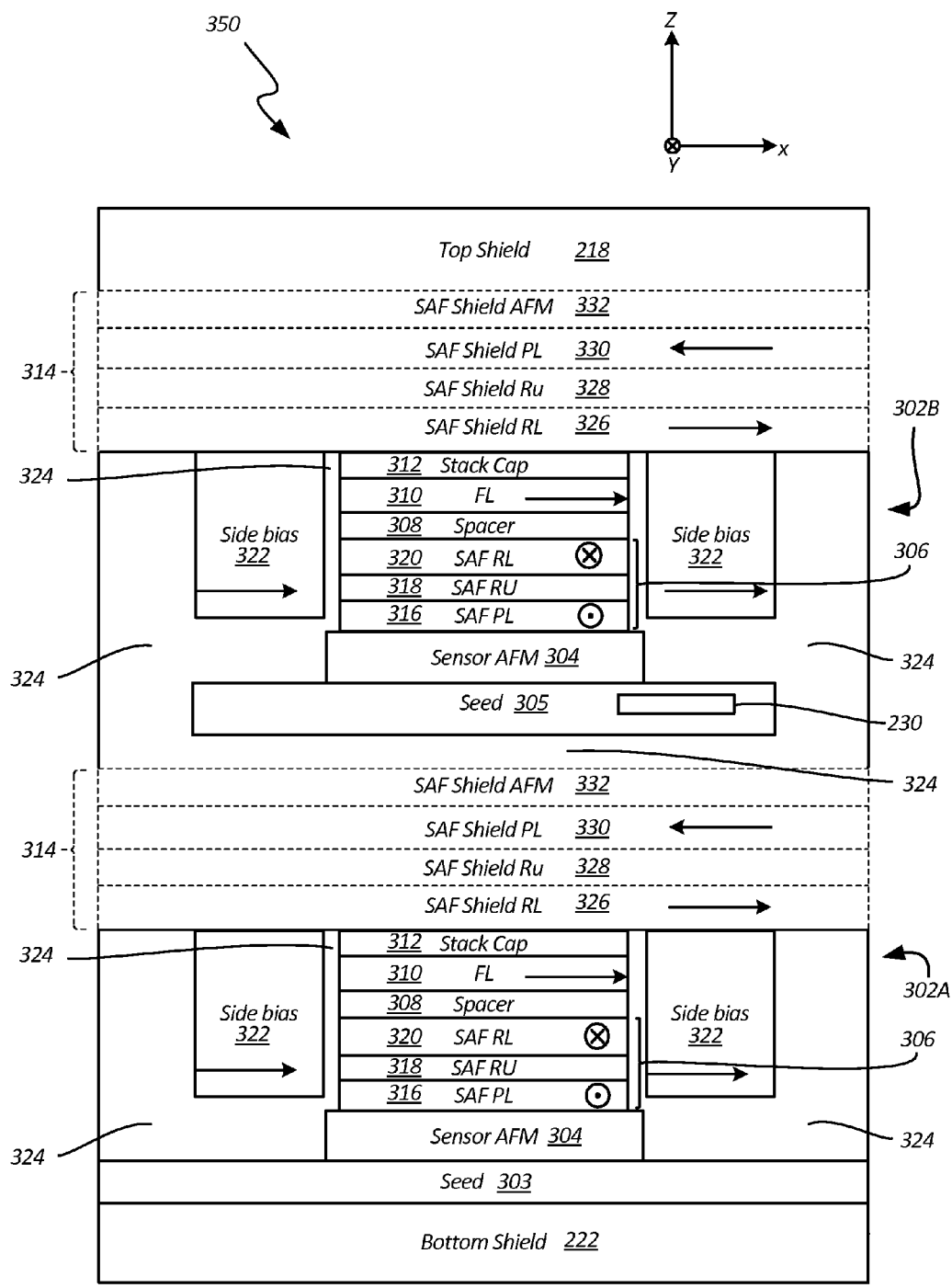
FIG. 3B is a bearing surface view of a magnetic reproducing device having multiple sensors of the type shown in FIG. 3A, and a stabilization feature in an upper sensor.

To address challenges posed by greater data density requirements and faster data transfer speeds, read transducer 220 includes multiple sensors 226 and 228. It should be noted that only two sensors 226 and 228 are shown in FIG. 2 in the interest of simplification. However, in different multi-sensor reader embodiments, any suitable number of sensors may be employed. In different multi-sensor reader embodiments, magnetic sensors may be stacked along a track direction (i.e., a z-direction in FIG. 2) or a track width direction that is perpendicular to the track direction (i.e., a cross-track direction, which is an x-direction in FIG. 2). A y-direction in FIG. 2 is then defined as a direction that is perpendicular to x and z simultaneously, which is a stripe-height direction. In the embodiment show in FIG. 2, sensors 226 and 228 are stacked along the track direction. In such embodiments, it is desirable to reduce spacing between primary sensing components of adjacent sensors 226 and 228 in order to achieve a high data storage density and because of head skew relative to the data tracks. However, as will be described further below, certain design changes to reduce spacing between primary sensing components may introduce unwanted magnetic instability. Accordingly, in the embodiment of FIG. 2, read transducer 220 includes at least one stabilization feature 230. Different layers of an embodiment of an individual sensor are shown in FIG. 3A, and FIG. 3B shows a multi-sensor reader including two sensors of the type shown in FIG. 3A. Details regarding a stabilization feature such as 230 are then provided further below in connection with FIGS. 4-6.

FIG. 3A is a schematic block diagram illustrating an example read head 300 including a single magnetoresistive sensor 302. The magnetoresistive sensor 302 is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor antiferromagnetic (AFM) layer 304, a sensor stack synthetic antiferromagnetic (SAF) structure 306, a spacer layer 308, a free layer or sensing layer 310 and a stack cap 312. Magnetoresistive sensor 302 also includes a seed element/layer 303 between the bottom shield 222 and the AFM layer 304. A SAF shielding structure 314 may optionally be included above the stack cap 312. Dashed lines are used to represent elements within structure 314 to indicate that structure 314 is optional.

In the embodiment shown in FIG. 3A, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (i.e., the y direction) of FIG. 3A and anti-parallel to each other.

In one implementation, the free layer 310 is not exchange coupled to, for example, an antiferromagnet. As a result, the magnetic moment of the free layer 310 is free to rotate under the influence of an applied magnetic field in a range of interest. The read head 300 further includes side biasing magnets or side shields 322, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. In some embodiments, the side biasing magnets or side shields 332 are formed of soft magnetic material (i.e., material that can be easily magnetized and demagnetized at relatively low magnetic fields). The soft magnetic material may be an alloy comprising Ni and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3A.

In the embodiment shown in FIG. 3A, optional SAF shielding structure 314 includes a SAF shield reference layer 326, a thin SAF shield separation layer 328, which may comprise a metal such as Ru in some embodiments, a SAF shield pinned layer 330 and a SAF shield AFM layer 332. Because, in some embodiments, sensor 300 utilizes soft side shields 322, SAF shield reference layer 326 needs to have a relatively fixed magnetization to assist in stabilizing the magnetizations of side shields 322. Thus, AFM layer 332 needs to pin the magnetization of layer SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe). It should be noted that, instead of employing SAF shielding structure 314, side shields 332 may be stabilized by shape anisotropy, by employing hard magnetic layers adjacent to the soft magnetic layers within side shield 332, or by any other suitable technique.

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

FIG. 3B is a schematic block diagram illustrating an example read head 350 including multiple magnetoresistive sensors (for example, 302A and 302B) stacked along a track direction (i.e., the z-direction in FIG. 3B). In some embodiments, sensors 302A and 302B in sensor 350 may be isolated from each other by isolation layer 324, which is present in a region between sensors 302A and 302B in FIG. 3B. Each of sensors 302A and 302B is similar to sensor 302 of FIG. 3A and therefore a description of individual sensors 302A and 302B is not provided in connection with FIG. 3B. However, it should that, while shield 222 is a bottom shield for sensor 302A and element 303 is a separate seed for sensor 302A, element 305 has a dual function of being both a seed and a bottom shield for sensor 302B.

An important contributor to a down-track distance between sensors of a dual-sensor reader is a thickness of the seed of the upper sensor. Therefore, the seed of the upper sensor is made relatively thin and is not coupled to a separate bottom shield like the seed in the lower senor. Also, in the interest of thickness reduction, the seed of the upper sensor is typically not supported by an antiferromagnetic layer. Such a thin and unsupported seed may be prone to instability. Accordingly, seed 305 of read head 350 includes at least one stabilization feature 230. As will be described below, providing the stabilization feature 230 may involve providing multiple different layers in seed 305 such that seed 305 is not a bulk magnetic seed. In other words, seed 305 may be stabilized by way of a structural design change from a bulk magnetic shield to a multi-layered structure such as an SAF seed described below in connection with FIG. 4A.

Figure 4A:
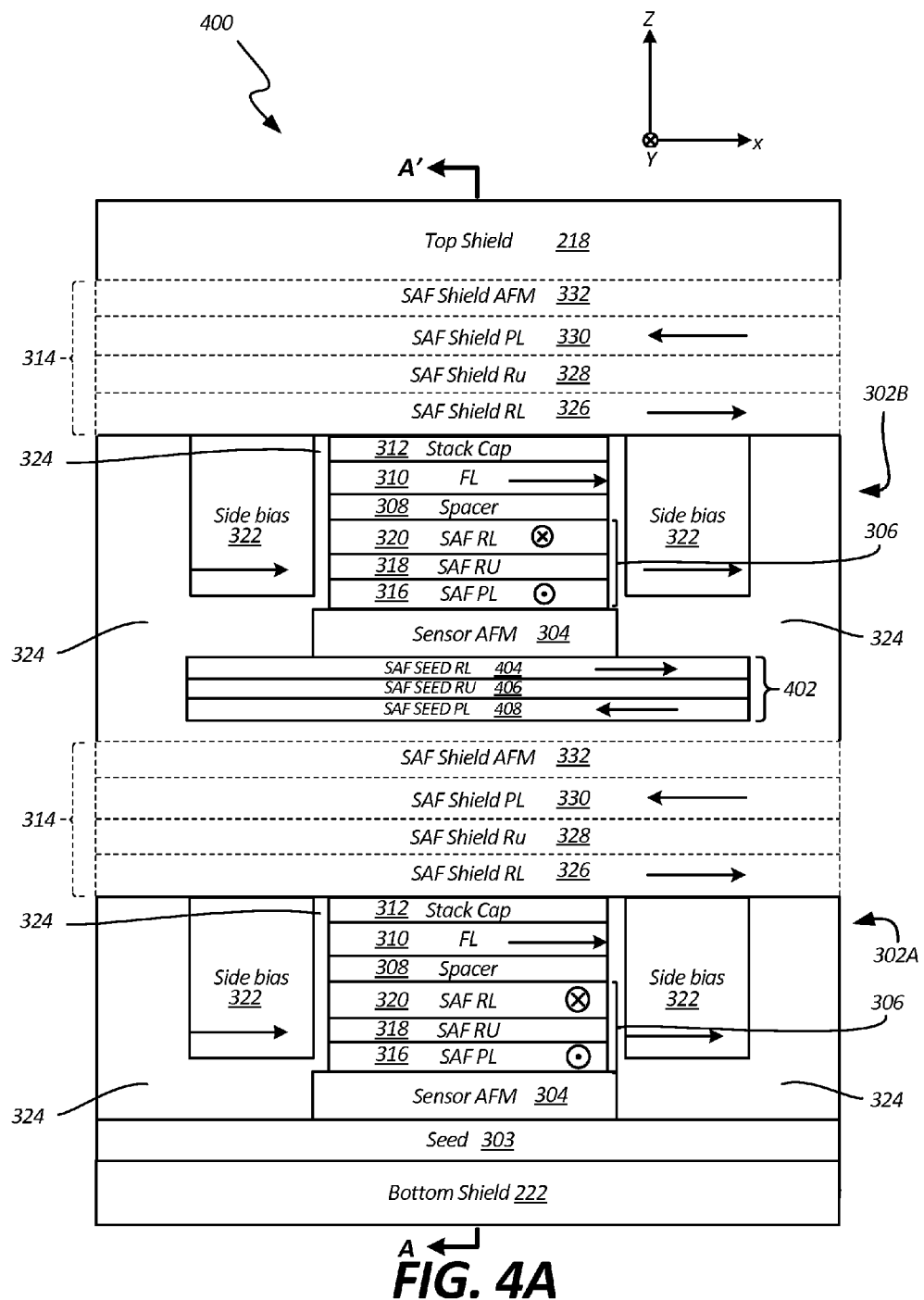
FIG. 4A is a bearing surface view of a multiple sensor reproducing device in accordance with embodiment that employs a synthetic antiferromagnetic (SAF) structure in a seed of an upper sensor.

FIG. 4A is a bearing surface view of a multiple sensor reader (denoted by reference numeral 400) that employs an SAF structure 402 as a seed for upper sensor 302B. In other respects, multiple-sensor reader 400 is substantially similar to multi-sensor reader 350 of FIG. 3B and a description of the similar elements is not repeated.

SAF seed structure 402 includes a SAF seed reference layer 404, a thin SAF shield separation layer 406, which may comprise a metal such as Ru in some embodiments, and a SAF seed pinned layer 408. The magnetic moments of each of the pinned layer 408 and the reference layer 404 are not allowed to rotate under magnetic fields in the range of interest (for example, magnetic fields generated by the bits of data stored on the data discs). The magnetic moments of the reference layer 404 and the pinned layer 408 are generally oriented cross-track (i.e., the x direction) of FIG. 4A and anti-parallel to each other.

In some embodiments, SAF seed reference layer 404 and SAF seed pinned layer 408 may be formed of a soft magnetic material (for example, an alloy comprising Ni and Fe). In other embodiments, the magnetic layers (SAF seed reference layer 404 and SAF seed pinned layer 408) of SAF seed structure 402 are formed of a material having a higher moment than NiFe. As indicated earlier, element 402 has a dual function of being both a seed and a bottom shield for sensor 302B. In a certain thickness range (for example, 5 nanometers (nm) to 50 nm), the shielding effect of a SAF element such as 402 is a function of both a thickness of the SAF element such as 402 and a moment of the magnetic layers in the SAF element 402. Accordingly, employing relatively high-moment magnetic layers for the SAF seed reference layer 404 and the SAF seed pinned layer 408 allows for a reduction in thicknesses of these layers without a corresponding reduction in, for example, a shielding effect of the SAF element 402 compared to the shielding effect of a similar thicker SAF element with NiFe magnetic layers. As indicated above, in some embodiments, the relatively high magnetic moment value of the magnetic layers (SAF seed reference layer 404 and SAF seed pinned layer 408) of SAF seed element 402 is greater than that of NiFe. In other embodiments, the relatively high magnetic moment value of the magnetic layers (SAF seed reference layer 404 and SAF seed pinned layer 408) of SAF shielding element 402 is greater than about 1.5 Tesla. In such embodiments, examples of relatively high-moment materials that can be utilized for the magnetic layers 404 and 408 are CoFe and CoNiFe. Of course, other high-moment magnetic materials may also be suitable in certain applications.

Figure 4B:
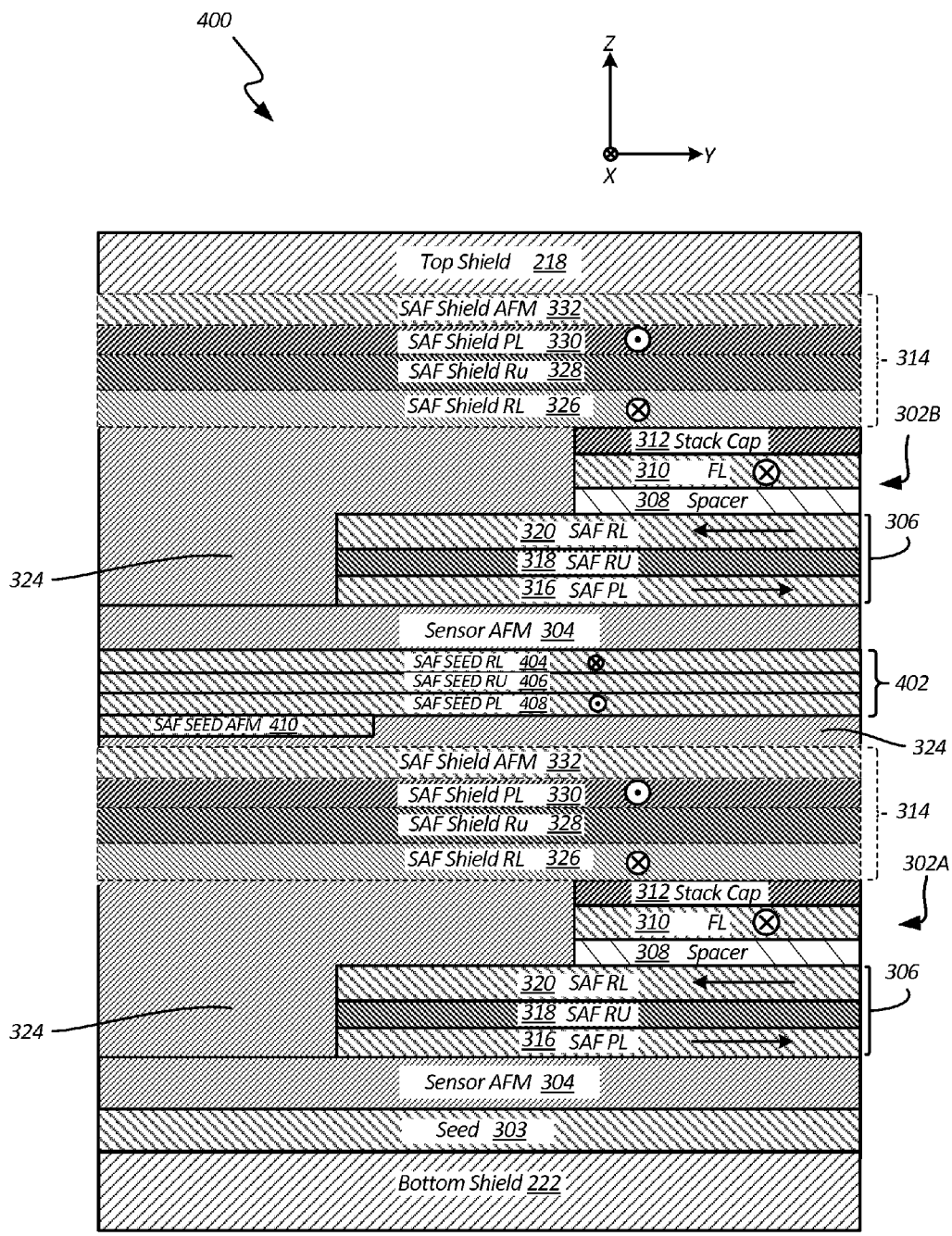
FIG. 4B is a sectional view of the multiple sensor reproducing device of FIG. 4A.

In one embodiment, SAF seed structure 402 is stabilized by a SAF seed AFM that is recessed from the bearing surface. FIG. 4B is a cross-sectional view of multi-sensor reader 400 of FIG. 4A through a plane orthogonal to the bearing surface and the layers of the sensor stack (along line A-A' shown in FIG. 4A). In FIG. 4B, the recessed SAF shield AFM layer is denoted by reference numeral 410. The unidirectional anisotropy due to the SAF seed AFM 410 helps ensure that the polarity of the SAF (i.e., the magnetic orientations of SAF seed reference layer 404 and SAF seed pinned layer 408 in the range of interest) is suitably maintained. The recessed SAF seed AFM layer 410 may be formed using any suitable deposition technique. It should be noted that, in different embodiments, the SAF seed AFM layer 410 may be in a location other than that shown in FIG. 4B as long as the SAF seed AFM layer 410 is able to provide magnetic coupling to the SAF seed element 402.

Figure 4C:
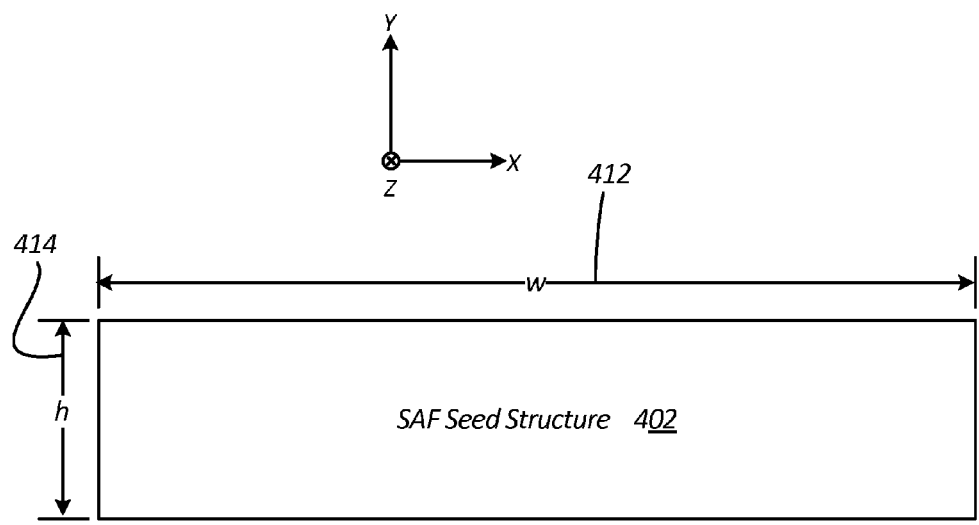
FIG. 4C is a top view of an SAF seed element which may be used in the reproducing device of FIG. 4A.

In certain other embodiments, no AFM layer such as 410 is utilized to stabilize SAF seed structure 402 and layer 410 may be replaced by an insulator such as 324. In such embodiments, SAF seed structure 402 may by stabilized by uniaxial anisotropy induced by shape (for example, different width and height dimensions for SAF 402). FIG. 4C shows a top view of SAF shielding structure 402 in accordance with one embodiment. In the embodiment of FIG. 4C, the uniaxial anisotropy is provided in the SAF seed structure 402 by employing a width, w (denoted by reference numeral 412), of the SAF seed structure 402 along the x direction that is substantially larger than a height, h (denoted by reference numeral 414), of the SAF shielding structure 402 along the y direction. In a particular embodiment, the width, w, of the SAF shielding structure 402 is at least twice as large as the height, h, of the SAF shielding structure 402. It should be noted that techniques other than shape anisotropy may be utilized to provide stabilization without an external/separate pinning layer such as AFM 410 in a SAF seed structure such as 402. The techniques include film growth with a suitable aligning magnet and/or deposition of the film(s) at a controlled angle of incidence, suitable thermal annealing processes, etc. It should be noted that, in some embodiments, a combination of pinning techniques such as those shown in FIGS. 4B and 4C may be utilized to stabilize SAF seed structure 402.

Figure 4D:
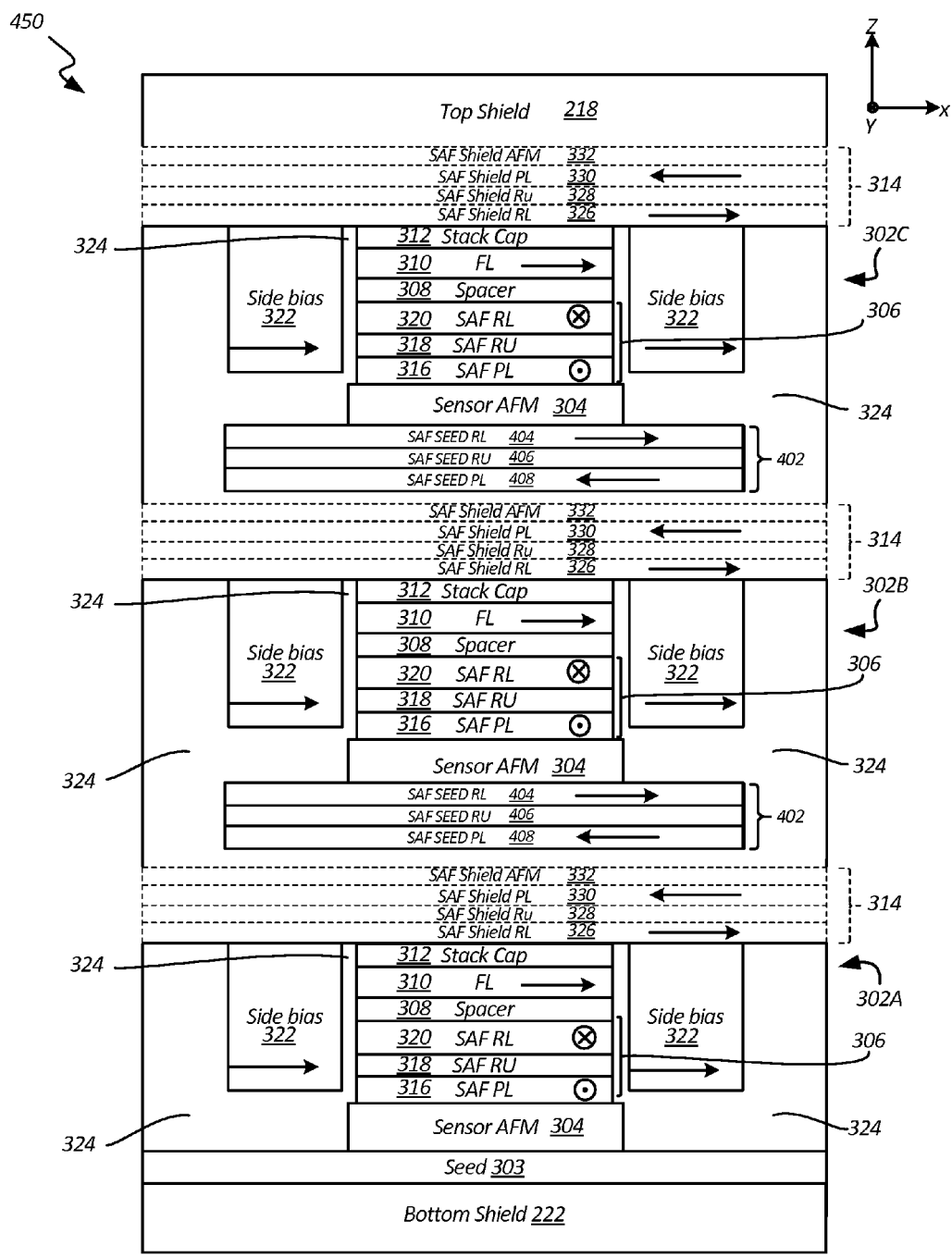
FIG. 4D is a bearing surface view of a multiple sensor reproducing device in accordance with one embodiment.

The SAF seed reader design can be employed for the two-sensor reader 400 shown in FIG. 4A or for a reader 450 with more than two sensors (for example, 302A, 302B and 302C) as shown in FIG. 4D.

As noted earlier, multi-sensor readers that employ a relatively thin bulk magnetic layer as a seed for an upper sensor may suffer from unwanted magnetic instability. Further, with such thin bulk magnetic seeds, elevated Barkhausen jumps (a succession of abrupt changes in magnetization occurring when a magnetizing force acting on a piece/layer of magnetic material is varied) and elevated sensitivity of Barkhausen jumps to temperature have been observed.

In the embodiments described above, the bulk magnetic seed of the upper sensor(s) is replaced by a seed with a stabilization feature (for example, a SAF magnetic seed). This improves the magnetic seed stability/noise while substantially preserving the low inter-sensor distance.

Further, the new design has shown Barkhausen jump values equivalent to those of a single-sensor reader in which a magnetic seed is coupled to a bulk shield. Additionally, in such embodiments, Barkhausen jump sensitivity to temperature also substantially matches that of the single-sensor reader design. In the SAF magnetic seed embodiments described above, a read signal amplitude obtained by an upper sensor is also increased relative to a read signal amplitude in an upper sensor with a thin bulk magnetic seed.

It should be noted that, although the different figures show bottom and top sensors 302A and 302B aligned with each in the z direction, different sensors may be offset from each other in various embodiments.

Figure 5:
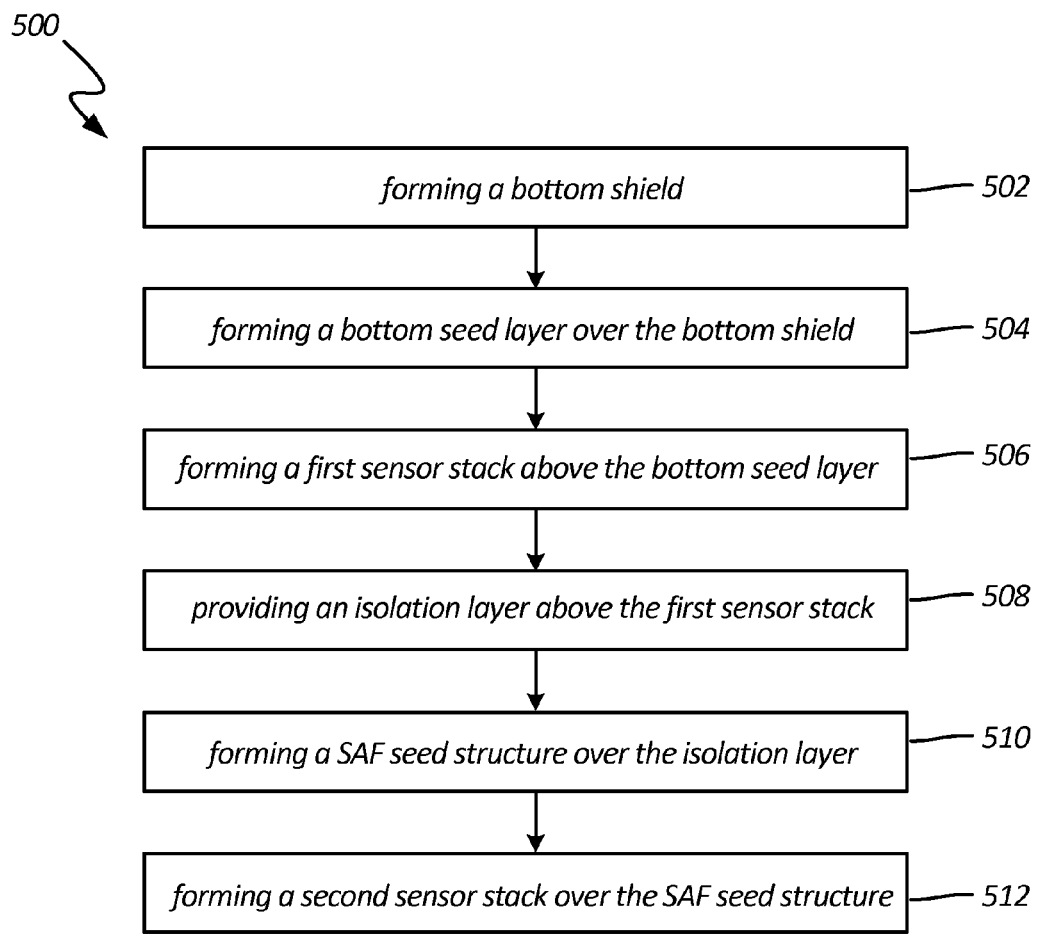
FIG. 5 is a flow diagram of a method embodiment.

FIG. 5 shows a simplified flow diagram 500 of a method of forming a multi-sensor reader in accordance with one embodiment. At step 502, a bottom shield is formed. At step 504, a bottom seed layer is formed over the bottom shield. This is followed by step 506 at which a first sensor stack is formed above the bottom seed layer. At step 508, an isolation layer is provided above the first sensor stack. At step 510, a SAF seed structure is formed over the isolation layer. At step 512, a second sensor stack is formed over the SAF seed structure.

It should be noted that any suitable deposition techniques may be used to form the different layers in steps 502-512. It should also be noted that the multi-sensor reader may include several additional layers formed between, above, and/or below the layers formed in steps 502-512.

Although various examples of stabilization features within multiple sensor magnetic reproducing devices are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the multiple sensor magnetic reproducing device with the stabilization feature while maintaining substantially the same functionality without departing from the scope and spirit of the present disclosure. In addition, although the embodiments described herein are directed to a particular type of multiple sensor magnetic reproducing device utilized in a particular data storage system, it will be appreciated by those skilled in the art that the teachings of the present disclosure can be applied to other data storage devices without departing from the scope and spirit of the present disclosure.

What is claimed is:

1. A multi-sensor reader comprising:
a first sensor comprising:
a first sensor stack comprising a sensing layer having a magnetization that changes according to an external magnetic field; and
a first seed element below the first sensor stack; and
a second sensor stacked over the first sensor, the second sensor comprising:
a second sensor stack comprising a sensing layer having a magnetization that changes according to the external magnetic field; and
a second seed element below the second sensor stack, wherein the second seed element is structurally different from the first seed element, and wherein the second seed element comprises a stabilization feature, and wherein the second seed element is not in contact with, and not coupled, to a separate bottom shield; and a shield synthetic antiferromagnetic (SAF) structure between the first sensor stack and the second seed element, and wherein the shield SAF structure and the second seed element are separated only by an insulation layer.

2. The multi-sensor reader of claim 1 and wherein the stabilization feature comprises a synthetic antiferromagnetic (SAF) structure having antiferromagnetically coupled magnetic layers.

3. The multi-sensor reader of claim 2 and wherein the magnetic layers are formed of NiFe.

4. The multi-sensor reader of claim 2 and wherein the magnetic layers are formed of at least one of CoFe or CoNiFe.

5. The multi-sensor reader of claim 2 and wherein the magnetic layers are formed of a material that has a magnetic moment value that is greater than 1.5 Tesla.

6. The multi-sensor reader of claim 2 and wherein the stabilization feature SAF structure is stabilized using shape anisotropy.

7. The multi-sensor reader of claim 5 and wherein a width of the stabilization feature SAF structure is at least twice as large as a height of the SAF structure.

8. The multi-sensor reader of claim 2 and wherein the stabilization feature SAF structure is stabilized by a recessed antiferromagnetic layer.

9. A multi-sensor reader comprising:
a first sensor comprising:
   a first sensor stack comprising a sensing layer having a magnetization that changes according to an external magnetic field; and
   a first seed element below the first sensor stack; and
a second sensor stacked over the first sensor, the second sensor comprising:
   a second sensor stack comprising a sensing layer having a magnetization that changes according to the external magnetic field; and
   a second seed element below the second sensor stack, wherein the second seed element comprises a synthetic antiferromagnetic (SAF) structure, and wherein the second seed element is not in contact with, and not coupled, to a separate bottom shield; and a shield synthetic antiferromagnetic (SAF) structure between the first sensor stack and the second seed element, and wherein the shield SAF structure and the second seed element are separated only by an insulation layer.

10. The multi-sensor reader of claim 9 and wherein the first seed element is a bulk magnetic seed.

11. The multi-sensor reader of claim 10 and further comprising a bottom shield adjacent to the first seed element.

12. The multi-sensor reader of claim 9 and wherein the SAF structure of the second seed element is stabilized using shape anisotropy.

13. The multi-sensor reader of claim 9 and wherein the SAF structure of the second seed element is adjacent to the insulation layer that electrically isolates the first sensor from the second sensor.

14. The multi-sensor reader of claim 9 and wherein the SAF structure of the second seed element comprises magnetic layers formed of at least one of NiFe, CoFe or CoNiFe.

15. A method of forming a multi-sensor reader comprising:
   forming a bottom shield;
   forming a bottom seed layer over the bottom shield;
   forming a first sensor stack above the forming a shield synthetic antiferromagnetic (SAF) structure over the first sensor stack;
   providing an isolation layer above the shield SAF structure;
   forming a synthetic antiferromagnetic (SAF) seed structure over the isolation layer with no intervening shield layer between the SAF seed structure and the isolation layer; and
   forming a second sensor stack over the SAF seed structure.

16. The method of claim 15 and wherein forming the bottom seed layer comprises forming a bulk magnetic layer.

17. The method of claim 15 and wherein forming the SAF seed structure comprises:
   forming at least two magnetic layers; and
   antiferromagnetically coupling the magnetic layers.

18. The method of claim 17 and wherein forming the at least two magnetic layers comprises forming the at least two layers from at least one of NiFe, CoFe or CoNiFe.

19. The method of claim 17 and wherein forming the at least two magnetic layers comprises forming the at least two layers from a material have a magnetic moment value that is greater than 1.5 Tesla.

* * * * *